United States Patent
Onizuka

(10) Patent No.: US 10,008,712 B2
(45) Date of Patent: Jun. 26, 2018

(54) NEGATIVE ELECTRODE ACTIVE MATERIAL FOR LITHIUM ION SECONDARY BATTERY

(75) Inventor: Hiroshi Onizuka, Toyota-shi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 964 days.

(21) Appl. No.: 13/989,418

(22) PCT Filed: Nov. 26, 2010

(86) PCT No.: PCT/JP2010/071177
§ 371 (c)(1),
(2), (4) Date: May 24, 2013

(87) PCT Pub. No.: WO2012/070153
PCT Pub. Date: May 31, 2012

(65) Prior Publication Data
US 2013/0244118 A1    Sep. 19, 2013

(51) Int. Cl.
*H01M 4/13* (2010.01)
*H01M 4/133* (2010.01)
*H01M 4/36* (2006.01)
*H01M 4/587* (2010.01)
*H01M 10/0525* (2010.01)

(52) U.S. Cl.
CPC .......... *H01M 4/133* (2013.01); *H01M 4/366* (2013.01); *H01M 4/587* (2013.01); *H01M 10/0525* (2013.01); *Y02T 10/7011* (2013.01); *Y10T 29/49115* (2015.01)

(58) Field of Classification Search
CPC ...... H01M 4/133; H01M 4/366; H01M 4/587; H01M 10/0525
See application file for complete search history.

(56) References Cited

U.S. PATENT DOCUMENTS 5,523,179 A  *  6/1996  Chu .................. H01M 4/04
                                                      136/238
6,482,547 B1    11/2002  Yoon et al.
(Continued)

FOREIGN PATENT DOCUMENTS

CN        1237003        12/1999
JP      2001-15168        1/2001
(Continued)

OTHER PUBLICATIONS

Tomita, Takashi, JP 2002-083602, Published Mar. 22, 2002, Translated on Jul. 30, 2016.*

*Primary Examiner* — Jimmy Vo
(74) *Attorney, Agent, or Firm* — Finnegan, Henderson, Farabow, Garrett & Dunner, LLP

(57) ABSTRACT

The present invention provides a negative electrode active material which can prevent reduction in battery capacity by suppressing reaction of an electrolyte solution at the surface of the negative electrode active material as well as can reduce resistance resulting from the formation of a film. A negative electrode active material 90 for a lithium ion secondary battery comprises a carbon material 92 capable of reversibly storing and releasing lithium, an amorphous carbon membrane 94 coating the surface of the carbon material and a film 96 containing a phosphate compound and coating the surface of the amorphous carbon membrane.

7 Claims, 5 Drawing Sheets

(56) References Cited

U.S. PATENT DOCUMENTS

2008/0102376 A1* 5/2008 Kato .................. C01B 25/455
                                                                429/332
2009/0123844 A1   5/2009  Morigaki et al.
2009/0181311 A1   7/2009  Iwanaga et al.
2012/0171571 A1   7/2012  Kurakane et al.

FOREIGN PATENT DOCUMENTS

| JP | 2002-83602 | 3/2002 |
| JP | 2002-324580 | 11/2002 |
| JP | 2003-151559 | 5/2003 |
| JP | 2004-247187 | 9/2004 |
| JP | 2006-310265 | 11/2006 |
| JP | 2008-27837 | 2/2008 |
| JP | 2011-29160 | 2/2011 |
| WO | WO 2006/057110 A1 | 6/2006 |
| WO | WO 2007/139130 A1 | 12/2007 |

* cited by examiner

NEGATIVE ELECTRODE ACTIVE MATERIAL FOR LITHIUM ION SECONDARY BATTERY

CROSS-REFERENCE TO RELATED APPLICATIONS

This application is a national phase application of International Application No. PCT/JP201 0/071177, filed Nov. 26, 2010, the content of which is incorporated herein by reference.

TECHNICAL FIELD

The present invention relates to a negative electrode active material for a lithium ion secondary battery and the use thereof.

BACKGROUND ART

Lithium ion secondary batteries, in which lithium ions migrate between positive and negative electrodes for charging and discharging, have been attracting increasing importance because they can provide high energy density with light weight, so that they can be preferably used for power supplies for personal computers and mobile terminals, particularly for in-car power supplies.

Negative electrodes for this type of lithium ion secondary battery typically contain, as a material (negative electrode active material) which can reversibly store and release lithium ions, particle carbon materials (carbon particles) having at least partially a graphite structure (layer structure). Typical structures of negative electrodes include, for example, a layer (negative electrode mixture layer) mainly containing carbon particles as a negative electrode active material retained on a negative electrode current collector.

Upon charging lithium ion secondary batteries, lithium ions are generally consumed at the surface of a negative electrode active material for reductive degradation reaction of an electrolyte solution to form a solid electrolyte interface (SEI). The SEI suppresses further reductive degradation reaction of the electrolyte solution at the surface of the negative electrode active material, so that lithium ions can be easily and smoothly enter and leave the negative electrode active material.

However, upon an initial charge, a SEI may be formed as a result of excessive degradation of an electrolyte solution at the surface of a negative electrode active material. In such a case, lithium ions are excessively consumed and the initial efficiency (i.e. battery capacity) of lithium ion secondary batteries may be reduced. In order to address this problem, Patent Literature 1 may be mentioned as prior art. Patent Literature 1 discloses a technique for improving the battery capacity by coating the surface of a negative electrode active material with a phosphate compound polymer in order to suppress the reaction between lithium ions and an electrolyte solution. Patent Literature 2 to Patent Literature 4 may also be mentioned as prior art relating to negative electrode active materials and negative electrodes for lithium ion secondary batteries.

CITATION LIST

Patent Literature

Patent Literature 1: Japanese Patent Application Laid-open No. 2002-083602
Patent Literature 2: WO 2007/139130
Patent Literature 3: Japanese Patent Application Laid-open No. 2001-015168
Patent Literature 4: WO 2006/057110

SUMMARY OF INVENTION

According to the technique disclosed in Patent Literature 1, although degradation reaction of an electrolyte solution at the surface of a negative electrode active material can be suppressed by means of the phosphate compound polymer, resistance may be increased because of the film.

Thus, the present invention is achieved in order to solve the above problem of the prior art and has an object to provide a negative electrode active material which can prevent reduction in battery capacity by suppressing the reaction of an electrolyte solution at the surface of the negative electrode active material, and can reduce resistance resulting from the formation of a film. Another object of the present invention is to provide a method for producing a lithium ion secondary battery comprising the negative electrode active material described herein.

In order to achieve the above objectives, the present invention provides a negative electrode active material for a lithium ion secondary battery. Namely, the negative electrode active material for a lithium ion secondary battery described herein comprises a carbon material capable of reversibly storing and releasing lithium, an amorphous carbon membrane coating a surface of the carbon material and a film containing a phosphate compound and coating a surface of the amorphous carbon membrane.

The negative electrode active material for a lithium ion secondary battery provided by the present invention comprises the amorphous carbon membrane formed on the surface of the carbon material and the film containing the phosphate compound coating the surface of the amorphous carbon membrane (hereinafter the film containing the phosphate compound is merely referred to as "phosphate film").

Because the carbon material and the amorphous carbon membrane are coated by the phosphate film, the carbon material and the amorphous carbon membrane have limited contact with an electrolyte solution and excess degradation of the electrolyte solution at the surface of the carbon material or the amorphous carbon membrane can be prevented. Accordingly, the irreversible capacity with consumption of lithium ions due to degradation reaction of the electrolyte solution can be reduced and the initial charge-discharge efficiency can be increased. In addition, the carbon material is covered with the amorphous carbon membrane and the phosphate film is formed on the surface of the amorphous carbon membrane, so that the negative electrode active material has preferable lithium ion conducting property at the surface thereof compared to a phosphate film directly formed on the carbon material and reaction resistance (e.g. initial resistance) resulting from the formation of the phosphate film can be reduced.

According to one preferable aspect of the negative electrode active material for a lithium ion secondary battery described herein, the ratio between X (μg/g) and Y (m²/g), i.e. a value of X/Y, is 654 μg/m² or less, where X represents a PO4 film amount corresponding to the ratio between A (μg)

and B (g), i.e. A/B, where A represents an amount of phosphate ion in the film containing the phosphate compound and B represents a total mass of the carbon material and the amorphous carbon membrane; and Y represents a specific surface area based on the BET method of the carbon material coated with the amorphous carbon membrane. Preferably, the value of X/Y is 168 μg/m² to 654 μg/m². By selecting the negative electrode active material so that the value of X/Y falls within the above range, the negative electrode active material has improved lithium ion conducting property at the surface thereof and reaction resistance (e.g. initial resistance) resulting from the formation of the phosphate film can be further reduced.

According to another preferable aspect of the negative electrode active material for a lithium ion secondary battery described herein, the amorphous carbon membrane has an R value (IB/IA) of 0.1 to 1, which is the intensity ratio between a peak intensity IA at around 1580 cm$^{-1}$ and a peak intensity IB at around 1360 cm$^{-1}$ of a Raman spectrum, and has a half width value of the peak at around 1360 cm$^{-1}$ of 45 cm$^{-1}$ to 90 cm$^{-1}$.

Due to the above configurations, the amorphous carbon membrane has the crystallinity within a suitable range, and thus the phosphate film formed on the surface of the amorphous carbon membrane can be further improved.

According to the present invention, a lithium ion secondary battery is also provided which comprises any of the negative electrode active materials described herein. The above negative electrode active material comprises the phosphate film having low resistance which can suppress degradation of an electrolyte solution at the surface of the amorphous carbon membrane, and thus can provide high performance (e.g. high initial efficiency, excellent cycle characteristics) which is suitable to be used as a negative electrode active material for a lithium ion secondary battery.

According to another mode of the present invention, a method for producing a lithium ion secondary battery containing a positive electrode, a negative electrode and an electrolyte solution is provided. Namely, the method for producing a lithium ion secondary battery described herein comprises the steps of: forming a negative electrode including a negative electrode active material containing a carbon material which is capable of reversibly storing and releasing lithium and is coated with an amorphous carbon membrane on the surface thereof, forming a positive electrode including a positive electrode active material, constructing a battery assembly by placing the thus formed positive and negative electrodes together with an electrolyte solution in a battery case and carrying out an initial charge of the battery assembly, wherein the electrolyte solution contains a phosphate compound and a film derived from the phosphate compound is formed on a surface of the amorphous carbon membrane by the initial charge.

According to the method for producing the lithium ion secondary battery of the present invention, a film containing the phosphate compound can be formed on the surface of the amorphous carbon membrane coating the surface of the carbon material by carrying out an initial charge of the lithium ion secondary battery utilizing the electrolyte solution containing the phosphate compound.

By carrying out an initial charge with the electrolyte solution containing the phosphate compound, the film containing the phosphate compound can be easily formed on the surface of the amorphous carbon membrane.

According to one preferable aspect of the production method herein, as the carbon material coated with the amorphous carbon membrane, a carbon material is used such that an R value (IB/IA), which is an intensity ratio between a peak intensity IA at around 1580 cm$^{-1}$ and a peak intensity IB at around 1360 cm$^{-1}$ of a Raman spectrum of the amorphous carbon membrane, is 0.1 to 1 and a half width value of the peak at around 1360 cm$^{-1}$ of the amorphous carbon membrane is 45 cm$^{-1}$ to 90 cm$^{-1}$.

Due to the above configurations, the amorphous carbon membrane has the crystallinity within a suitable range, and thus the lithium ion secondary battery comprising the negative electrode active material having further improved performance can be produced.

According to another preferable aspect of the production method described herein, the phosphate compound used is phosphoric acid. Due to this configuration, the film containing the phosphate compound can be easily formed on the surface of the amorphous carbon membrane.

DESCRIPTION OF EMBODIMENTS

Figure 1:
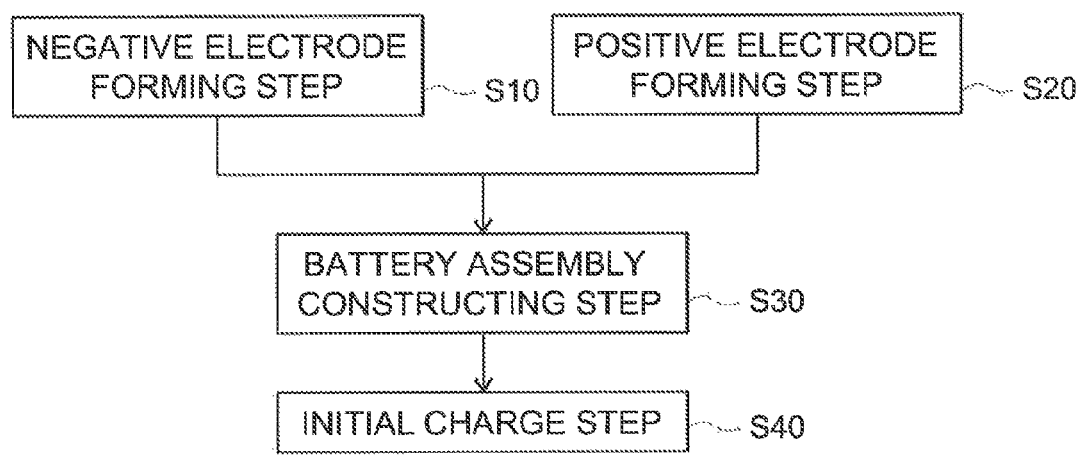
FIG. 1 is a flow chart illustrating the method for producing a lithium ion secondary battery according to one embodiment of the present invention.

The preferable embodiments of the present invention are illustrated hereinbelow. The matters which are not specifically referred herein and which are necessary for carrying out the present invention may be understood as design choices by a person skilled in the art based on the prior art. The present invention can be carried out based on the content described herein and the common technical knowledge in the art.

The negative electrode active material for a lithium ion secondary battery provided according to the present invention is now described. The negative electrode active material for a lithium ion secondary battery disclosed herein is characterized in that it is formed by a carbon material capable of reversibly storing and releasing lithium and that it comprises an amorphous carbon membrane coating the surface of the carbon material and a film containing a phosphate compound (phosphate film) and coating the surface of the amorphous carbon membrane.

The carbon material, which is a main constituent of the negative electrode active material for a lithium ion secondary battery described herein, may include a carbon material (typically in the form of a particle) capable of reversibly storing and releasing lithium, for example, a carbon material in the form of a particle (carbon particle) having at least partially a graphite structure (layer structure). Any carbon materials including so-called graphitic (graphite), non-graphitizable carbon (hard carbon), graphitizable carbon (soft carbon) and the one having a combined structure thereof may be suitably used. Preferably, graphite particles such as natural graphite can be used, for example.

The amorphous carbon membrane which is contained in the negative electrode active material described herein and coats the surface of the carbon material, is carbon which has low crystallinity and has stacking disorders of carbon layers, contains extremely small crystallites formed by carbon atoms having $sp^2$ hybrid orbitals, has other binding forms than $sp^2$ hybrid orbitals and the like. The amorphous carbon membrane is preferably contained at about 1 to 10 mass parts (e.g. 2 to 6 mass parts) relative to 100 mass parts of the carbon material mainly forming the negative electrode active material.

The crystallinity of the amorphous carbon membrane is assessed by Raman spectrometry. Raman spectra can be measured by appropriately employing the methods well known in the art. The amorphous carbon membrane preferably has an R value (IB/IA) of 0.1 to 1, which is the intensity ratio between the peak intensity IA at around 1580 $cm^{-1}$ (e.g. in the range of 1570 $cm^{-1}$ to 1620 $cm^{-1}$ (G band)) and the peak intensity IB at around 1360 $cm^{-1}$ (e.g. in the range of 1300 $cm^{-1}$ to 1400 $cm^{-1}$ (D band)) obtained by Raman spectrometry using an appropriate laser light source (e.g. argon ion laser), and has the half width value of the peak at around 1360 $cm^{-1}$ (e.g. in the range of 1300 $cm^{-1}$ to 1400 $cm^{-1}$) of 45 $cm^{-1}$ to 90 $cm^{-1}$. When the amorphous carbon membrane has an R value of far less than 0.1 or has the half width value of far less than 45 $cm^{-1}$, the amorphous carbon membrane has extremely high crystallinity, the phosphate film formed on the surface of the amorphous carbon membrane (at the surface of the negative electrode active material) has decreased lithium ion conducting property and thus reaction resistance (e.g. initial resistance) may be increased. When the amorphous carbon membrane has an R value of far more than 1 or has the half width value of far more than 90 $cm^{-1}$, the amorphous carbon membrane has extremely low crystallinity and thus the phosphate film formed on the surface of the amorphous carbon membrane may have decreased film strength. Due to this, the phosphate film may be destroyed during charge and discharge of the lithium ion secondary battery and the electrolyte solution may be degraded at the surface of the amorphous carbon membrane, resulting in decreased battery capacity.

The surface of the carbon material may be coated with the amorphous carbon membrane by any method without limitation as far as it can form the amorphous carbon membrane on the surface of the carbon material. For example, the amorphous carbon membrane may be formed by coating the surface of the carbon material with a carbonizable material which is a precursor of amorphous carbon such as pitches (e.g. petroleum pitch, coal tar pitch, naphtha pitch etc.) or organic polymeric compounds (e.g. phenol resins, cellulose resins, polyamide resins etc.), followed by heat treatment (e.g. calcination) at a temperature which does not proceed graphitization of the precursor. The precursor may be attached on the surface of the carbon material by the dry method or wet method. The dry and wet methods are the same as those well known in the art and do not characterize the present invention, and thus are not described in further detail. It is also possible to adsorb (deposit) amorphous carbon on the surface of the carbon material by carrying out the reaction with carbon source gas according to the plasma-CVD method.

The phosphate compound in the film (phosphate film) coating the surface of the amorphous carbon membrane contained in the negative electrode active material described herein may be one, two or more compounds selected from the compounds containing, for example, $H_2PO_3$, $PO_3$, $CH_4PO_4$, $C_2H_6PO_4$, $C_2H_6PO_5$, $C_4H_6PO_3F$, $HPO_3F$, $PO_4$ anions and the like. Upon charge and discharge of the lithium ion secondary battery, the electrolyte solution has less contact with the carbon material and the amorphous carbon membrane because the carbon material and the amorphous carbon membrane are coated with the film (phosphate film) containing the phosphate compound. Therefore, degradation of the electrolyte solution can be suppressed at the surface of the carbon material and the amorphous carbon membrane, resulting in prevention of reduction in battery capacity. In addition, the film containing the phosphate compound has preferable lithium ion conducting property by coating the surface of the amorphous carbon membrane. Due to this, the lithium ion secondary battery can have reduced reaction resistance (initial resistance).

The negative electrode active material described herein is preferably the one having the value Z ($\mu g/m^2$) of 800 $\mu g/m^2$ or less (e.g. 654 $\mu g/m^2$ or less, preferably 100 $\mu g/m^2$ to 654 $\mu g/m^2$, more preferably 168 $\mu g/m^2$ to 654 $\mu g/m^2$) calculated as the ratio ($PO_4$ film amount X/BET specific surface area Y) between the $PO_4$ film amount X (g/g), which corresponds to the ratio A/B between the phosphate ion amount A ($\mu g$) in the film containing the phosphate compound (phosphate film) and the total mass B (g) of the carbon material and the amorphous carbon membrane, and the specific surface area Y ($m^2/g$) of the carbon material coated with the amorphous carbon membrane based on the BET method. When the negative electrode active material has the value Z (the value of X/Y) of far less than 100 $\mu g/m^2$, the phosphate film formed on the amorphous carbon membrane may not be sufficient and thus the phosphate film may be destroyed upon charge and discharge of the lithium ion secondary battery, resulting in progress in degradation reaction of the electrolyte solution at the surface of the amorphous carbon membrane or the carbon material and a decrease in battery capacity. When the negative electrode active material has the value Z (the value of X/Y) of far more than 800 $\mu g/m^2$, excess phosphate film may be formed on the surface of the amorphous carbon membrane and thus the phosphate film itself may serve as a resistor, so that reaction resistance (e.g. initial resistance) may be increased upon charge and discharge of the lithium ion secondary battery.

The specific surface area based on the BET method refers to the value measured according to JIS K1477 (JIS Z 8830).

The phosphate ion amount A can be measured according to the method well known in the art, for example, by subjecting a solution obtained by adding the phosphate film to a mixed solvent of water and acetonitrile to ion chromatography using a mass spectrometer as a detector (ion chromatography-mass spectrometry (IC-MS)) in order to perform quantitative analysis of phosphate ion in the solution.

The surface of the amorphous carbon membrane may be coated with the film containing the phosphate compound by, for example, placing the carbon material coated with the amorphous carbon membrane into an electrolyte solution containing a predetermined phosphate compound in order to soak the carbon material therein. Preferably, certain voltage at an electric potential relative to a metal lithium electrode of 2.5 V or less is applied to the carbon material coated with the amorphous carbon membrane. The above electrolyte solution used may be the same as non-aqueous electrolyte solutions for conventional lithium ion secondary batteries without limitation. The non-aqueous electrolyte solutions typically contain a supporting salt in an appropriate non-aqueous solvent. The non-aqueous solvent may include, for example, cyclic carbonates such as ethylene carbonate (EC), propylene carbonate (PC) and the like; linear carbonates such as dimethyl carbonate (DMC), diethyl carbonate (DEC), ethyl methyl carbonate (EMC) and the like; cyclic esters such as γ-butyrolactone, γ-valerolactone and the like; linear esters such as methyl acetate, methyl propionate and the like; cyclic ethers such as tetrahydrofuran, dioxane and the like; linear ethers such as dimethoxyethane and the like; and sulfur-containing non-aqueous organic solvents such as dimethyl sulfoxide and the like. One, two or more of these non-aqueous solvents may be used in any combination in any mixing ratio. The supporting salt (supporting electrolyte) used may be, for example, lithium salts such as $LiPF_6$, $LiBF_4$, $LiAsF_6$, $LiCF_3SO_3$, $LiC_4FgSO_3$, $LiN(CF_3SO_2)_2$, $LiC(CF_3SO_2)_3$ and the like.

The phosphate compound added to the electrolyte solution may include compounds which contain phosphor-containing anions. The phosphor-containing anion may include, for example, $PO_4$ anion, $PO_3F$ anion, $PO_2F_2$ anion and the like. Cations which are combined with these anions may not be limited in the type thereof as far as they do not affect the performance of the lithium ion secondary battery and may include, for example, hydrogen ion, lithium ion, sodium ion, potassium ion and the like. The compound which contains the phosphor-containing anion may include, for example, phosphoric acid ($H_3PO_4$), lithium phosphate and the like.

The non-aqueous electrolyte solution may be added with other additive(s) conventionally used for non-aqueous electrolyte solutions at any ratio as far as it(they) does(do) not significantly impair the effects of the present invention, which may be, for example, compounds that can provide overcharge prevention effects, negative electrode film formation effects, positive electrode protecting effects and the like including organic compounds such as cyclohexylbenzene, biphenyl, vinylene carbonate, fluoroethylene carbonate; and inorganic salts such as bis(oxalato)borate, difluoro(oxalato)borate, tris(oxalato)borate, difluorobis(oxalato)phosphate and the like.

The method for producing a lithium ion secondary battery described herein is now illustrated in detail. The method for producing a lithium ion secondary battery described herein is characterized in that, as described above, a film derived from a predetermined phosphate compound contained in an electrolyte solution is formed on the surface of the amorphous carbon membrane in the negative electrode by carrying out an initial charge of the lithium ion secondary battery comprising the electrolyte.

One preferable aspect of the method for producing a lithium ion secondary battery described herein is now illustrated in detail by referring to FIG. 1.

The method for producing a lithium ion secondary battery described herein comprises the steps of: (1) forming a negative electrode including a carbon material coated with an amorphous carbon membrane on the surface thereof (negative electrode forming step S10); (2) forming a positive electrode including a positive electrode active material (positive electrode forming step S20); (3) constructing a battery assembly by placing the thus formed positive and negative electrodes together with an electrolyte solution in a battery case (battery assembly constructing step S30); and (4) carrying out an initial charge of the constructed battery assembly (initial charge step S40).

First, the step of forming a negative electrode including, as a negative electrode active material, the carbon material coated with the amorphous carbon membrane on the surface thereof as described above (negative electrode forming step S10) is now illustrated.

A paste composition for negative electrode mixture layer formation (a paste composition includes a slurry composition and an ink-like composition; the paste composition is hereinafter merely referred to as "the paste") is prepared which comprises the carbon material (e.g. natural graphite) coated with the amorphous carbon membrane on the surface thereof and a binding agent (binder) both of which are dispersed in a predetermined solvent.

The binding agent may be appropriately the same as those used for negative electrodes of conventional lithium ion secondary batteries. For example, when an aqueous paste is to be prepared, the binding agent may be preferably a polymer material which can dissolve or disperse in water. Examples of the polymer material which can dissolve in water (water-soluble) may be cellulose polymers such as carboxymethyl cellulose (CMC), methyl cellulose (MC), cellulose acetate phthalate (CAP), hydroxypropylmethyl cellulose (HPMC) and the like, polyvinyl alcohol (PVA) and the like. Examples of the polymer material which can disperse in water (water-dispersible) may be fluororesins such as polytetrafluoroethylene (PTFE) and the like; vinyl acetate copolymers; rubbers such as styrene-butadiene rubbers (SBRs) and the like.

The term "aqueous paste" as used herein is a general idea referring to a composition comprising water or a mixed solvent mainly containing water (aqueous solvent) as a dispersant of the carbon material. The solvent which may form the mixed solvent together with water may be one, two or more appropriately selected from organic solvents which is uniformly miscible with water (lower alcohols, lower ketones etc.).

The thus prepared paste for negative electrode mixture layer formation is provided (typically applied) on the surface of a negative electrode current collector and dried to form a negative electrode mixture layer optionally followed by compression (pressing). Thereby the negative electrode can be prepared which comprises the negative electrode current collector and the negative electrode mixture layer comprising the carbon material coated with the amorphous carbon membrane on the surface thereof.

The negative electrode current collector may be preferably, similar to current collectors used for negative electrodes of conventional lithium ion secondary batteries, a conductive member formed by a conductive metal including, for example, copper or nickel materials or alloy materials mainly including the aforementioned materials. The shape of the negative electrode current collector may vary according to the shape and the like of the lithium ion secondary battery without limitation and may include various shapes such as rod shape, plate shape, sheet shape, foil shape and the like.

The paste may be appropriately applied according to the same methods as those well known in the art. For example, the paste can be suitably applied on the negative electrode current collector by using an appropriate applicator such as a slit coater, a die coater, a gravure coater and the like. The solvent can be appropriately dried by using one or more of natural air dry, hot air, low-moisture air, vacuum, infrared ray, far infrared ray and electron beam. The compression method may be the well known roll press method, flat press method and the like.

The step of forming a positive electrode including a positive electrode active material (positive electrode forming step S20) is now illustrated. First, a paste for positive electrode mixture layer formation is prepared which comprises the positive electrode active material, a conductive material and a binding agent which are dispersed in a predetermined solvent.

The positive electrode active material is a material which can store and release lithium and may include lithium-containing compounds containing the lithium element together with one, two or more transition metal elements (e.g. lithium-transition metal complex oxides). The positive electrode active material may be, for example, lithium-cobalt complex oxide ($LiCoO_2$), lithium-nickel complex oxide ($LiNiO_2$), lithium-manganese complex oxide ($LiMn_2O_4$); a so-called binary lithium-containing complex oxide containing two kinds of transition metal elements such as nickel-cobalt type represented by $LiNi_xCo_{1-x}O_2$ (0<x<1), cobalt-manganese type represented by $LiCo_xMn_{1-x}O_2$ (0<x<1), nickel-manganese type represented by $LiNi_xMn_{1-x}O_2$ (0<x<1) and $LiNi_xMn_{2-x}O_4$ (0<x<2) and the like; or a ternary lithium-containing complex oxide containing three kinds of transition metal elements such as nickel-cobalt-manganese type.

The positive electrode active material may be an olivine-type lithium phosphate represented by the general formula $LiMPO_4$, where M is at least one element among Co, Ni, Mn and Fe, including, for example, $LiFePO_4$, $LiMnPO_4$.

The binding agent appropriately may be the same as the binding agents used for positive electrodes of conventional lithium ion secondary batteries. When an aqueous paste is prepared, the binding agent appropriately may be the same as the binding agent used for the above negative electrode. When a solvent-based paste is prepared, a polymer material which can dissolve in an organic solvent (non-aqueous solvent) can be used such as polyvinylidene fluoride (PVDF), polyvinylidene chloride (PVDC) and the like. The term "solvent-based paste" as used herein is a general idea referring to a composition mainly containing an organic solvent as a dispersant for the positive electrode active material. The organic solvent used may be, for example, N-methylpyrrolidone (NMP) and the like.

The conductive material may be any conductive material which is conventionally used for this type of lithium ion secondary batteries without particular limitation and may be, for example, carbon materials such as carbon powder, carbon fiber and the like. Carbon powder used may be various carbon black (e.g. acetylene black, furnace black, ketjen black etc.), graphite powder and the like which may be used one, two or more in combination.

The thus prepared paste for positive electrode mixture layer formation is provided (typically applied) on the surface of a positive electrode current collector and dried to form a positive electrode mixture layer optionally followed by compression (pressing). Thereby the positive electrode comprising the positive electrode current collector and the positive electrode mixture layer comprising the positive electrode active material can be prepared.

The positive electrode current collector used may be preferably, similar to current collectors used for positive electrodes of conventional lithium ion secondary batteries, a conductive member formed by a conductive metal including, for example, aluminum materials or alloy materials mainly including aluminum materials. The shape of the positive electrode current collector may be the same as the shape of the negative electrode current collector.

The step of constructing a battery assembly by placing the thus formed positive and negative electrodes together with an electrolyte solution in a battery case (battery assembly constructing step S30) is now illustrated. The prepared positive and negative electrodes are stacked together with two separator sheets and wound to prepare a wound electrode assembly. The wound electrode assembly is then placed in the battery case (e.g. a flat, rectangular solid-shaped case) and the electrolyte solution is injected in the battery case. The opening of the battery case is then sealed with a lid to obtain the battery assembly. The electrolyte solution used may be the same as non-aqueous electrolyte solutions used for conventional lithium ion secondary batteries without limitation. The non-aqueous electrolyte solutions typically contain a supporting salt in an appropriate non-aqueous solvent. The non-aqueous solvent used may be, for example, one, two or more selected from EC, PC, DMC, DEC, EMC and the like. The supporting salt (supporting electrolyte) used may be, for example, lithium salts such as $LiPF_6$, $LiBF_4$ and the like. The electrolyte solution further comprises a phosphate compound. The phosphate compound is a compound which contains a phosphor-containing anion and may include, for example, phosphoric acid ($H_3PO_4$) and phosphate salts such as lithium phosphate and the like. The separator sheet may include those formed by porous polyolefin-based resins and the like.

The step of carrying out an initial charge of the constructed battery assembly (initial charge step S40) is now illustrated. The initial charge may be carried out in the same manner as conditioning (initial charge-discharge) for conventional general lithium ion secondary batteries. Typically, the initial charge is carried out at a relatively low charge rate (e.g. 1 C or lower, typically 1/20 C to 1/3 C) from the initiation of charge to SOC 100% being achieved.

Figure 2:
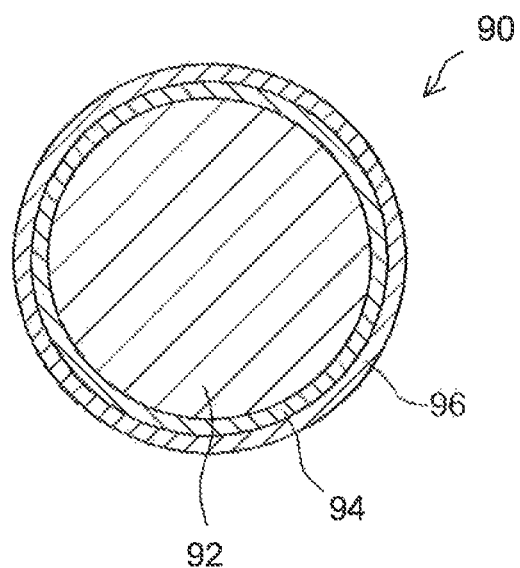
FIG. 2 is a schematic view of the structure of the negative electrode active material according to one embodiment of the present invention.

As a result of the initial charge of the battery assembly, as shown in FIG. 2, the film (phosphate film) 96 derived from the phosphate compound is formed on the surface of the amorphous carbon membrane 94 coating the carbon material 92 in the negative electrode. Through the above steps, the lithium ion secondary battery can be produced which comprises, in the negative electrode, the negative electrode active material 90 comprising the carbon material 92, the amorphous carbon membrane 94 and the phosphate film 96.

The thus produced lithium ion secondary battery is able to have reduced initial resistance and reduction in the battery capacity can be prevented by suppressing degradation reaction of the electrolyte solution.

One mode of the constructed lithium ion secondary battery is now described by referring to the figures. However, it is not intended to limit the present invention to this embodiment. Namely, the shape (outer shape or size) of the constructed lithium ion secondary battery is not particularly limited as far as it comprises the negative electrode active material comprising the carbon material, the amorphous carbon membrane and the phosphate film. In the following embodiment, the lithium ion secondary battery is exemplified which comprises a wound electrode assembly and an electrolyte solution in a battery case having a rectangular shape.

In the following figures, members and positions which provide same effects may be marked with the same symbols and redundant explanations may be omitted. The dimensions (length, width, thickness etc.) in the figures do not necessarily reflect the actual dimensions.

Figure 3:
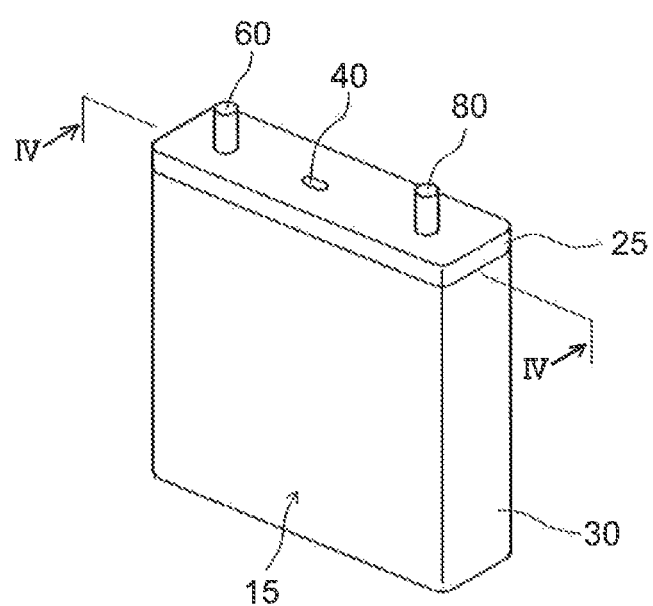
FIG. 3 is a perspective view schematically illustrating the outer shape of the lithium ion secondary battery according to one embodiment of the present invention.
Figure 4:
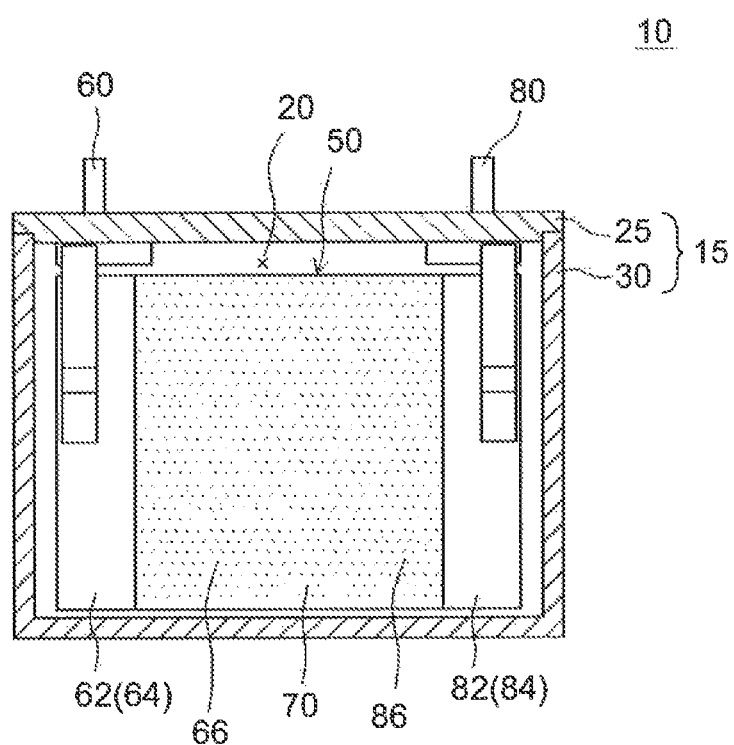
FIG. 4 is a sectional view taken along line IV-IV of FIG. 3.

FIG. 3 is a perspective view schematically illustrating the lithium ion secondary battery 10 according to the present embodiment. FIG. 4 is a vertical sectional view taken along line IV-IV of FIG. 3.

As shown in FIG. 3, the lithium ion secondary battery 10 according to the present embodiment comprises a battery case 15 made of a metal (resin or laminate film may also be suitable). The case (outer container) 15 comprises a case body 30 having a flat rectangular solid shape with a top end being open and a lid 25 covering the opening 20. The opening 20 of the case body 30 is sealed with the lid 25 by welding and the like. The upper face of the case 15 (i.e. the lid 25) is provided with a positive electrode terminal 60 which is electrically connected to a positive electrode sheet 64 of the wound electrode assembly 50 and a negative electrode terminal 80 which is electrically connected to a negative electrode sheet 84 of the electrode assembly 50. The lid 25 is also provided with, similar to the cases for conventional lithium ion secondary batteries, a safety valve 40 for discharging the gas generated in the case 15 upon battery troubles. The case 15 comprises the wound electrode assembly 50 having a flat shape, which is prepared by stacking the positive electrode sheet 64 and the negative electrode sheet 84 with two separator sheets 90, winding the same and squashing the obtained wound assembly from both sides to crush the same, and the electrolyte solution.

When carrying out stacking as described above, the positive electrode sheet 64 and the negative electrode sheet 84 are stacked together, as shown in FIG. 4, with some shift in the width direction so that a positive electrode mixture layer non-forming part (i.e. a part where the positive electrode current collector 62 is exposed without the positive electrode mixture layer 66 being formed thereon) of the positive electrode sheet 64 and a negative electrode mixture layer non-forming part (i.e. a part where the negative electrode current collector 82 is exposed without the negative electrode mixture layer 86 being formed thereon) of the negative electrode sheet 84 are respectively protruded from both sides along the width direction of the separator sheets 90. As a result, in the lateral direction relative to the winding direction of the wound electrode assembly 50, the electrode mixture layer non-forming parts of the positive electrode sheet 64 and negative electrode sheet 84, respectively, are protruded outward from a winding core portion (i.e. a portion where the positive electrode mixture layer forming part of the positive electrode sheet 64, a negative electrode mixture layer forming part of the negative electrode sheet 84 and two separator sheets 90 are closely wound). The protruded part on the positive electrode side is joined to the positive electrode terminal 60 in order to electrically connect the positive electrode sheet 64 of the flat-shaped wound electrode assembly 50 and the positive electrode terminal 60. Similarly, the protruded part on the negative electrode side is joined to the negative electrode terminal 80 in order to electrically connect the negative electrode sheet 84 and the negative electrode terminal 80. The positive and negative electrode terminals 60 and 80 and the positive and negative electrode current collectors 62 and 82 may be respectively joined, for example, by ultrasonic welding, resistance welding and the like.

Examples with regard to the present invention are illustrated hereinbelow, which are not intended to limit the present invention.

Example 1

Natural graphite coated with an amorphous carbon membrane on the surface thereof, SBR as a binding agent and CMC as a thickener were weighed at a mass ratio of 98:1:1, respectively, and dispersed in ion exchange water to prepare a paste for negative electrode mixture layer formation. The amorphous carbon membrane had the R value (IB/IA; hereinafter merely referred to as "the R value") of 0.5, which is the intensity ratio between the peak intensity IA at around 1580 $cm^{-1}$ and the peak intensity IB at around 1360 $cm^{-1}$ of a Raman spectrum of the amorphous carbon membrane, and the half width value of the peak at around 1360 $cm^{-1}$ of the amorphous carbon membrane (hereinafter merely referred to as "the half width value") of 70 $cm^{-1}$. The natural graphite coated with the amorphous carbon membrane had the BET specific surface area measured according to JIS K 1477 (JIS K 8830) of 4 $m^2/g$ and was 0.088 g. The above paste was applied on a copper foil having a thickness of 10 μm at an application amount of 4 $mg/cm^2$ per side and subjected to a process with a roll press to prepare a sheet-shaped negative electrode of Example 1 which comprises a negative electrode mixture layer on the copper foil.

Meanwhile, $LiNi_{1/3}Mn_{1/3}Co_{1/3}O_2$ as a positive electrode active material, acetylene black (AB) as a conductive material and PVDF as a binding agent were weighed at a mass ratio of 90:8:2, respectively, and dispersed in NMP to prepare a paste for positive electrode mixture layer formation. The paste was applied on an aluminum foil having a thickness of 15 μm at an application amount of 6 $mg/cm^2$ per side and subjected to a process with a roll press to prepare a sheet-shaped positive electrode of Example 1 which comprises a positive electrode mixture layer on the aluminum foil.

The thus prepared positive electrode of Example 1 and the negative electrode of Example 1 were placed facing each other (stacked) with a separator sheet (a porous polypropylene/polyethylene composite membrane) therebetween and placed in a laminated case (laminate film) with an electrolyte solution to prepare ten lithium ion secondary batteries (hereinafter merely referred to as "secondary batteries") of Example 1. The electrolyte solution used was obtained by adding 0.02 mol/L phosphoric acid ($H_3PO_4$) to a 1 mol/L solution of $LiPF_6$ in a mixed solvent of ethylene carbonate (EC), dimethyl carbonate (DMC) and ethyl methyl carbonate (EMC) at a volume ratio of 1:1:1.

Example 2

Natural graphite coated with an amorphous carbon membrane used had the BET specific surface area of 4 $m^2/g$. The electrolyte solution used was obtained by adding 0.05 mol/L phosphoric acid to a 1 mol/L solution of $LiPF_6$ in a mixed solvent of EC, DMC and EMC at a volume ratio of 1:1:1. Ten secondary batteries of Example 2 were prepared in the same manner as Example 1 other than the points mentioned above.

Example 3

Ten secondary batteries of Example 3 were prepared in the same manner as Example 2 except that natural graphite coated with an amorphous carbon membrane had the R value of 1 and the half width value of 70 $cm^{-1}$.

Example 4

Ten secondary batteries of Example 4 were prepared in the same manner as Example 2 except that natural graphite coated with an amorphous carbon membrane had the R value of 0.1 and the half width value of 90 $cm^{-1}$.

Example 5

Ten secondary batteries of Example 5 were prepared in the same manner as Example 1 except that natural graphite (0.088 g) coated with an amorphous carbon membrane had the R value of 0.5, the half width value of 45 cm$^{-1}$ and the BET specific surface area of 2 m$^2$/g.

Example 6

Natural graphite (0.088 g) coated with an amorphous carbon membrane used had the BET specific surface area of 2 m$^2$/g. The electrolyte solution was obtained by adding 0.075 mol/L phosphoric acid to a 1 mol/L solution of LiPF$_6$ in a mixed solvent of EC, DMC and EMC at a volume ratio of 1:1:1. Ten secondary batteries of Example 6 were prepared in the same manner as Example 1 other than the points mentioned above.

Example 7

Ten secondary batteries of Example 7 were prepared in the same manner as Example 2 except that natural graphite coated with an amorphous carbon membrane used had the R value of 1.2 and the half width value of 100 cm$^{-1}$.

Example 8

Ten secondary batteries of Example 8 were prepared in the same manner as Example 2 except that natural graphite coated with an amorphous carbon membrane used had the R value of 1 and the half width value of 100 cm$^{-1}$.

Example 9

Natural graphite coated with an amorphous carbon membrane used had the BET specific surface area of 1 m$^2$/g. The electrolyte solution was obtained by adding 0.075 mol/L phosphoric acid to a 1 mol/L solution of LiPF$_6$ in a mixed solvent of EC, DMC and EMC at a volume ratio of 1:1:1. Ten secondary batteries of Example 9 were prepared in the same manner as Example 1 other than the points mentioned above.

Example 10

Natural graphite having the BET specific surface area of 4 m$^2$/g, SBR as a binding agent and CMC as a thickener were weighed at a mass ratio of 98:1:1 and dispersed in ion exchange water to prepare a paste for negative electrode mixture layer formation. The amount of the natural graphite was 0.088 g. A sheet-shaped negative electrode of Example 10 was prepared with the paste. Ten secondary batteries of Example 10 were prepared in the same manner as Example 1 except that the thus obtained sheet-shaped negative electrode was used.

Example 11

Ten secondary batteries of Example 11 were prepared in the same manner as Example 1 except that the electrolyte solution was a 1 mol/L solution of LiPF$_6$ in a mixed solvent of EC, DMC and EMC at a volume ratio of 1:1:1.

<Initial Charge-Discharge Efficiency Measurement>

The thus prepared ten secondary batteries of Example 1 were measured for initial charge-discharge efficiency. Each secondary battery was charged up to 4.1 V under a temperature condition of 25° C. in a constant current-constant voltage (CC-CV) mode at the current value one-third of the battery capacity (Ah) predicted from the positive electrode theoretical capacity. Namely, the battery was charged until the final current value under constant voltage charge was one-tenth of the initial current value. The cumulative value of the current value obtained at this point was regarded as the initial charge capacity. After this charge, the battery was discharged to 3 V in a constant current (CC) mode at the current value one-fourth of the battery capacity predicted from the positive electrode theoretical capacity. The capacity obtained at this point was regarded as the initial discharge capacity. The initial charge-discharge efficiency (%) was obtained as the ratio of the initial discharge capacity relative to the initial charge capacity (initial discharge capacity/initial charge capacity×100). The average value of the initial charge-discharge efficiency for the secondary batteries is shown in Table 1. In the same manner, secondary batteries of Examples 2 to 11 were measured for the initial charge-discharge efficiency. The average values of initial charge-discharge efficiency for Examples are shown in Tables 1 to 3.

<Initial Resistance Measurement>

After measuring the initial charge-discharge efficiency, the secondary batteries were measured for initial resistance. Each secondary battery was adjusted so as to obtain the charge status of SOC 60% at the current value one-third of the battery capacity predicted from the positive electrode theoretical capacity. The battery was then discharged under a temperature condition of −15° C. in a constant current manner for 10 seconds at the current value three times of the battery capacity predicted from the positive electrode theoretical capacity, while the current (I)-voltage (V) plot was obtained and initial resistance (Ω) was determined from the slope of a primary fitted curve of the plot. The average value of the initial resistance for the secondary batteries is shown in Table 1. In the same manner, secondary batteries of Examples 2 to 11 were measured for initial resistance. The average values of initial resistance for Examples are shown in Tables 1 to 3.

<Measurement of Film Amount Containing Phosphate Compound>

Among the ten secondary batteries of Example 1 after the initial resistance measurement five secondary batteries were selected, negative electrodes thereof were taken out and subjected to quantitative analysis for the amount of the film containing the phosphate compound formed on the surface of the amorphous carbon membrane by ion chromatography-mass spectrometry. The amount of film containing the phosphate compound (PO$_4$ film amount) X (µg/g) is the value X (A/B) obtained as the ratio between the amount of phosphate ion A (µg) in the film containing the phosphate compound and the mass B (g) of the carbon material coated with the amorphous carbon membrane on the surface thereof. The average value of the percentage (wt %) of the PO$_4$ film amount X for these secondary batteries is shown in Table 1. In the same manner, secondary batteries of Examples 2 to 10 were measured for the amount X of the film containing the phosphate compound. The average values of the percentage (wt %) of the PO$_4$ film amount X for Examples are shown in Tables 1 to 3. With regard to Example 10, the amount of the film containing the phosphate compound formed on the surface of the natural graphite was analyzed in the quantitative manner.

The average values of the value Z (PO$_4$ film amount X/BET specific surface area Y) (µg/m$^2$) calculated as the ratio between the PO$_4$ film amount X (µg/g) and the BET specific surface area Y (m$^2$/g) of the natural graphite coated with the amorphous carbon membrane for secondary batteries of Examples 1 to 10 are shown in Tables 1 to 3. The specific surface area Y with regard to Example 10 is for natural graphite.

<High Temperature Storage Durability Test>

Among the ten secondary batteries of Example 1 after initial resistance measurement the remaining five secondary batteries were measured for capacity maintenance rate after a 30-day storage under a temperature condition of 60° C. Namely, each secondary battery was charged up to 4.1 V in a CCCV mode at 1 C prior to discharge to 3 V in a CC mode at C/3 and further discharge to 3 V in a CCCV mode at C/3. The capacity measured at this point was regarded as the initial battery capacity. Each secondary battery after measurement of initial battery capacity was adjusted so as to obtain the charge status SOC 80% in a CCCV mode. Each secondary battery was then stored in a thermostatic chamber at 60° C. for 30 days prior to measurement of the battery capacity after storage in the same manner as the measurement of the initial battery capacity described above. The capacity maintenance rate (%) after 30-day storage was obtained as (battery capacity after storage)/(initial battery capacity)×100. The average value of the capacity maintenance rate for the secondary batteries is shown in Table 1. In the same manner, the secondary batteries of Examples 2 to 11 were measured for capacity maintenance rate. The average values of capacity maintenance rate for Examples are shown in Tables 1 to 3.

TABLE 1

|  | Ex. 1 | Ex. 2 | Ex. 3 | Ex. 4 |
|---|---|---|---|---|
| Phosphate added amount (mol/L) | 0.02 | 0.05 | 0.05 | 0.05 |
| Average percentage (wt %) $PO_4$ film amount X | 0.09 | 0.15 | 0.15 | 0.15 |
| BET specific surface area Y (m$^2$/g) | 4 | 4 | 4 | 4 |
| Z (μg/m$^2$) | 216 | 378 | 378 | 378 |
| Amorphous carbon membrane | Yes | Yes | Yes | Yes |
| R value | 0.5 | 0.5 | 1 | 0.1 |
| Half width value (cm$^{-1}$) | 70 | 70 | 70 | 90 |
| Initial resistance (Ω) | 3.41 | 3.34 | 3.38 | 3.35 |
| Initial charge-discharge efficiency (%) | 84.1 | 84.3 | 83.9 | 84 |
| Capacity maintenance rate (%) | 87.2 | 87.5 | 87 | 87.2 |

TABLE 2

|  | Ex. 5 | Ex. 6 | Ex. 7 | Ex. 8 |
|---|---|---|---|---|
| Phosphate added amount (mol/L) | 0.02 | 0.075 | 0.05 | 0.05 |
| Average percentage $PO_4$ film amount X | 0.03 | 0.13 | 0.15 | 0.15 |
| BET specific surface area Y (m$^2$/g) | 2 | 2 | 4 | 4 |
| Z (μg/m$^2$) | 168 | 654 | 378 | 378 |
| Amorphous carbon membrane | Yes | Yes | Yes | Yes |
| R value | 0.5 | 0.5 | 1.2 | 1 |
| Half width value (cm$^{-1}$) | 45 | 70 | 100 | 100 |
| Initial resistance (Ω) | 3.45 | 3.4 | 3.4 | 3.3 |
| Initial charge-discharge efficiency (%) | 84.4 | 84.8 | 84.2 | 84.3 |
| Capacity maintenance rate (%) | 87 | 88 | 84.2 | 83.7 |

TABLE 3

|  | Ex. 9 | Ex. 10 | Ex. 11 |
|---|---|---|---|
| Phosphate added amount (mol/L) | 0.075 | 0.05 | — |
| Average percentage $PO_4$ film amount X | 0.1 | 0.15 | — |
| BET specific surface area Y (m$^2$/g) | 1 | 4 | 4 |
| Z (μg/m$^2$) | 1044 | 378 | — |
| Amorphous carbon membrane | Yes | No | Yes |
| R value | 0.5 | — | 0.5 |
| Half width value (cm$^{-1}$) | 70 | — | 70 |
| Initial resistance (Ω) | 3.61 | 3.72 | 3.77 |
| Initial charge-discharge efficiency (%) | 84.5 | 84.2 | 82.1 |
| Capacity maintenance rate (%) | 88.5 | 85 | 83.9 |

As shown in Tables 1 to 3, it was confirmed that the secondary batteries of Examples 1 to 10, which have the film containing the phosphate compound (phosphate film) on the surface of the amorphous carbon membrane or natural graphite, have suppressed degradation reaction of the electrolyte solution and thus have better initial charge-discharge efficiency compared to the secondary battery of Example 11. It was also confirmed that the secondary batteries of Examples 1 to 9, which contain natural graphite coated with the amorphous carbon membrane on the surface thereof, comprise the phosphate film having high lithium ion conducting property formed on the surface of the amorphous carbon membrane and thus have significantly reduced initial resistance compared to the secondary battery of Example 10. It was also confirmed that the secondary batteries of Examples 1 to 8 have reduced initial resistance compared to the secondary battery of Example 9. According to these results, it is found that the value Z ($PO_4$ film amount X/BET specific surface area Y) is appropriately at 800 μg/m$^2$ or less. Preferably Z is 654 μg/m$^2$ or less (e.g. 168 μg/m$^2$ to 654 μg/m$^2$). It was also confirmed that the secondary batteries of Examples 1 to 6 and 9 have a better capacity maintenance rate compared to the secondary batteries of Examples 7 and 8. According to these results, it is found that the amorphous carbon membrane appropriately have the R value of 0.1 to 1 and the half width value of 45 to 90 cm$^{-1}$.

The specific examples of the present invention have been illustrated hereinabove, which are merely examples and do not limit the scope of the claims. The features recited in the claims comprise various modifications and changes of the above specific examples.

INDUSTRIAL APPLICABILITY

Figure 5:
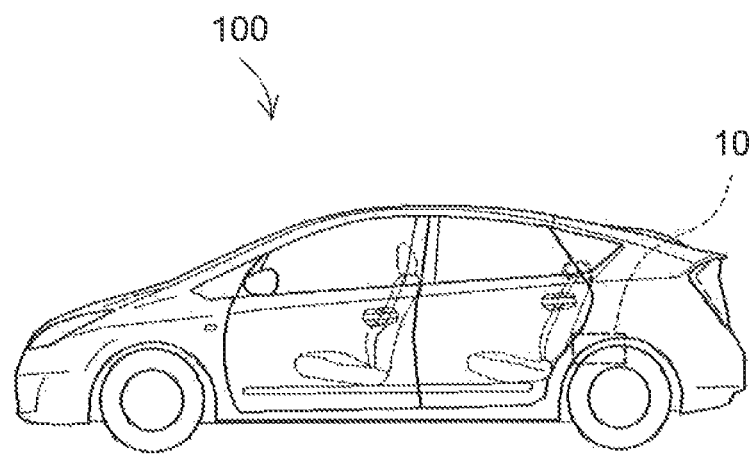
FIG. 5 is a side view schematically illustrating a vehicle (automobile) comprising the lithium ion secondary battery according to the present invention.

The lithium ion secondary battery comprising the negative electrode active material according to the present invention has low initial resistance and excellent cycle characteristics and thus can be suitably used as a power supply for motors (electric motors) provided on vehicles, particularly automobiles. Therefore, the present invention provides, as schematically shown in FIG. 5, a vehicle 100 (typically an automobile, particularly an automobile comprising an electric motor such as hybrid cars, electric cars, fuel cars and the like) comprising the lithium ion secondary battery 10 (typically an assembled battery containing more than one battery 10 being connected in series) as a power supply.

REFERENCE SIGNS LIST

10 Lithium ion secondary battery
15 Battery case
20 Opening
25 Lid
30 Case body
40 Safety valve
50 Wound electrode assembly
60 Positive electrode terminal
62 Positive electrode current collector
64 Positive electrode sheet (positive electrode)

66 Positive electrode mixture layer
70 Separator sheet
80 Negative electrode terminal
82 Negative electrode current collector
84 Negative electrode sheet (negative electrode)
86 Negative electrode mixture layer
90 Negative electrode active material
92 Carbon material
94 Amorphous carbon membrane
96 Phosphate film (film containing phosphate compound)
100 Vehicle (automobile)

The invention claimed is:

1. A lithium ion secondary battery comprises a negative electrode active material, comprising:
   a carbon material capable of reversibly storing and releasing lithium;
   an amorphous carbon membrane coating a surface of the carbon material; and
   a film containing a phosphate compound and coating a surface of the amorphous carbon membrane,
   wherein the phosphate compound comprises $PO_4$ and $PO_3F$ as phosphorus anions, and a value of X/Y is 100 µg/m2 or more and 800 µg/m² or less, where X (µg/g) represents a $PO_4$ film amount corresponding to a ratio A/B, where A (µg) represents an amount of phosphate ion in the film containing the phosphate compound and B (g) represents a total mass of the carbon material and the amorphous carbon membrane and X is 300 µg/g or more and 1500 µg/g or less; and Y (m²/g) represents a specific surface area based on the BET method of the carbon material coated with the amorphous carbon membrane and Y is 1 m²/g or more and 4 m²/g or less.

2. The lithium ion secondary battery according to claim 1, wherein the value of X/Y is 100 µg/m² or more and 654 µg/m² or less.

3. The lithium ion secondary battery according to claim 2, wherein the value of X/Y is 168 µg/m² to 654 µg/m².

4. The lithium ion secondary battery according to claim 1, wherein the amorphous carbon membrane has an R value (IB/IA) of 0.1 to 1, which is an intensity ratio between a peak intensity IA at around 1580 cm$^{-1}$ and a peak intensity IB at around 1360 cm$^{-1}$ of a Raman spectrum, and has a half width value of the peak at around 1360 cm$^{-1}$ of 45 cm$^{-1}$ to 90 cm$^{-1}$.

5. A method for producing a lithium ion secondary battery containing a positive electrode, a negative electrode and an electrolyte solution, comprising the steps of:
   forming a negative electrode including a negative electrode active material containing a carbon material which is capable of reversibly storing and releasing lithium and is coated with an amorphous carbon membrane on the surface thereof;
   forming a positive electrode including a positive electrode active material;
   constructing a battery assembly by placing the thus formed positive and negative electrodes together with an electrolyte solution in a battery case; and
   carrying out an initial charge of the battery assembly,
   wherein the electrolyte solution contains a phosphate compound comprising $PO_4$ and $PO_3F$ as phosphorous anions, and an amount of the phosphate compound is adjusted so as to obtain a value of X/Y of 100 µg/m2 or more and 800 µg/m2 or less, where X (µg/g) represents a PO4 film amount corresponding to a ratio A/B, where A (µg) represents an amount of phosphate ion in a film derived from the phosphate compound formed on a surface of the amorphous carbon membrane by the initial charge and B (g) represents a total mass of the carbon material and the amorphous carbon membrane and X is 300 µg/g or more and 1500 µg/g or less; and Y (m²/g) represents a specific surface area based on the BET method of the carbon material coated with the amorphous carbon membrane and Y is 1 m²/g or more and 4 m²/g or less.

6. The method according to claim 5, wherein, as the carbon material coated with the amorphous carbon membrane, the carbon material is used such that an R value (IB/IA), which is an intensity ratio between a peak intensity IA at around 1580 cm$^{-1}$ and a peak intensity IB at around 1360 cm$^{-1}$ of a Raman spectrum of the amorphous carbon membrane, is 0.1 to 1 and a half width value of the peak at around 1360 cm$^{-1}$ of the amorphous carbon membrane is 45 cm$^{-1}$ to 90 cm$^{-1}$.

7. The method according to claim 5, wherein the phosphate compound used is phosphoric acid.

* * * * *